US012430136B1

(12) United States Patent
Kotra et al.

(10) Patent No.: US 12,430,136 B1
(45) Date of Patent: Sep. 30, 2025

(54) SYSTEMS AND METHODS FOR BRANCH MISPREDICTION AWARE CACHE PREFETCHER TRAINING

(71) Applicant: Advanced Micro Devices, Inc., Santa Clara, CA (US)

(72) Inventors: Jagadish B. Kotra, Austin, TX (US); Gabriel H. Loh, Bellevue, WA (US); John Kalamatianos, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 1 day.

(21) Appl. No.: 18/622,576

(22) Filed: Mar. 29, 2024

(51) Int. Cl.
*G06F 9/38* (2018.01)

(52) U.S. Cl.
CPC .......... *G06F 9/3861* (2013.01); *G06F 9/3802* (2013.01); *G06F 9/3804* (2013.01)

(58) Field of Classification Search
CPC ........................... G06F 9/3802; G06F 9/3861
See application file for complete search history.

(56) References Cited

U.S. PATENT DOCUMENTS

2024/0329999 A1* 10/2024 Lee ................. G06F 9/3861
2025/0036416 A1* 1/2025 Al-Otoom ........... G06F 12/0875

FOREIGN PATENT DOCUMENTS

DE 102014000372 A1 * 7/2014 ............. G06F 12/08
EP 3553666 A1 * 10/2019 ......... G06F 12/0802

* cited by examiner

*Primary Examiner* — Jyoti Mehta
(74) *Attorney, Agent, or Firm* — Greenberg Traurig, LLP

(57) ABSTRACT

The disclosed device uses a control circuit configured to (i) receive branch misprediction information corresponding to a mispredicted branch window of instructions and (ii) send a misprediction status of a memory access from the mispredicted branch window of instructions, and a cache prefetcher of a cache configured to train using a set of memory accesses that are updated in response to receiving the misprediction status from the control circuit.

20 Claims, 9 Drawing Sheets

SYSTEMS AND METHODS FOR BRANCH MISPREDICTION AWARE CACHE PREFETCHER TRAINING

BACKGROUND

As computing requirements and needs continue to increase, techniques for increasing processing efficiency can provide performance gains. For instance, in an instruction pipeline of a processor, branch prediction techniques provide processing efficiencies by reducing stalls between instruction fetches. Similarly, caches can use cache prefetching techniques in anticipation of data that the processor can request. However, branch prediction can often mispredict leading to instruction fetches from a wrong path. In this manner, cache prefetchers inadvertently rely on these mispredicted instruction fetches for cache prefetching, resulting in unnecessary cache prefetches that adversely pollute the cache. Given the unresolved nature of branch prediction, informing the cache prefetcher about a mispredicted branch can allow the cache prefetcher to identify the fetches associated with the misprediction.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
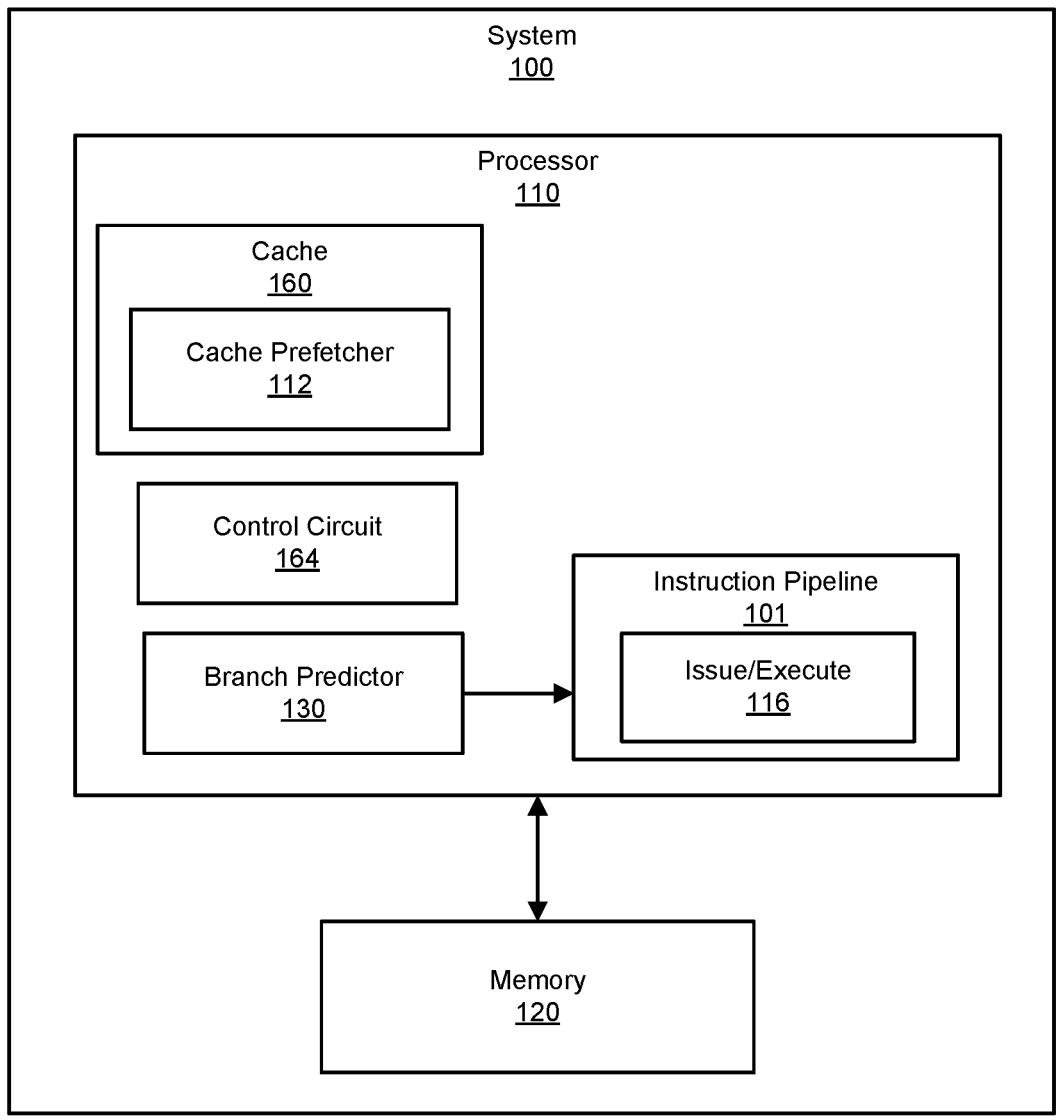
FIG. 1 is a block diagram of an exemplary system for branch misprediction aware cache prefetcher training.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION

The present disclosure is generally directed to misprediction-aware cache prefetcher training that allows training on data references from correctly predicted instruction fetches while minimizing training on data references from mispredicted instruction fetches. Typically, cache prefetchers predict the need for specific data and prefetch it before a memory request comes in. In this manner, cache prefetchers anticipate the need for this data based on observing the cache's previous memory accesses generated from instruction fetches. However, because cache prefetchers cannot distinguish between correctly predicted instruction fetches from mispredicted instruction fetches, cache prefetchers often unknowingly train on data requests from instruction fetches of wrongly predicted paths, often resulting in unnecessary cache prefetches. Receiving branch misprediction information can inform the cache prefetcher of which memory accesses to train on and which memory access to avoid for training. Therefore, training the cache prefetcher using branch misprediction information can improve the overall performance of the system because the cache prefetcher can selectively train on memory traffic from correctly predicted paths, resulting in more accurate cache prefetching.

As will be explained in greater detail down below, implementations of the present disclosure provide systems and methods for training a cache prefetcher using branch misprediction information received from a branch predictor. In one example, upon receiving the branch misprediction information corresponding to a mispredicted branch, a cache prefetcher can filter out, from the set of memory accesses, a speculative memory access corresponding to the mispredicted branch window, to selectively train on an updated set memory accesses reflecting the branch misprediction information. In this manner, cache prefetching accuracy can improve upon training with an updated set of memory accesses resulting in an overall reduction of pollution within the cache and avoiding the overhead associated with training on the mispredicted instruction fetches.

In one implementation, a device for branch misprediction aware cache prefetcher training includes a control circuit configured to (i) receive branch misprediction information corresponding to a mispredicted branch window of instructions and (ii) send a misprediction status of a memory access from the mispredicted branch window of instructions, and a cache prefetcher of a cache configured to train using a set of memory accesses that are updated in response to receiving the misprediction status from the control circuit.

In some examples, the cache prefetcher is configured to delay training, until the misprediction status is received from the control circuit, for updating the set of memory accesses. In some examples, the misprediction status identifies the memory access as at least one of a speculative memory access, a non-speculative memory access, or an unresolved memory access.

In some examples, the cache prefetcher is configured to (i) copy, prior to training, the set of memory accesses to a prefetcher table, (ii) train using a copied set of memory accesses in the prefetcher table, (iii) update the prefetcher table to filter out, from the copied set of memory accesses, a speculative memory access based on the received misprediction status, and (iv) retrain the cache prefetcher using the updated set of memory accesses in the prefetcher table.

In some examples, the cache prefetcher is configured to train using a heuristic. In some examples, the cache prefetcher is configured to train by using a subset of speculative memory accesses in the set of memory accesses selected based on the heuristic.

In some examples, the cache prefetcher is configured to train by retaining speculative memory accesses in the set of memory accesses based on a cache hit ratio corresponding to cache hits of prior speculative memory accesses observed over a period of cycles. In some examples, the cache prefetcher is configured to retain the speculative memory accesses in the set of memory accesses based on the cache hit ratio exceeding a cache hit ratio threshold.

In some examples, the cache prefetcher is configured to train by retaining speculative memory accesses in the set of memory accesses based on observing a number of cache lines fetched from prior speculative sets of memory accesses. In some examples, the cache prefetcher is configured to train by retaining the speculative memory accesses in the set of memory accesses based on the number of cache lines fetched from the prior speculative sets of instruction fetches exceeding a cache line threshold.

In some examples, a system for branch misprediction aware cache prefetcher training includes a physical memory and a processor including a branch predictor, an instruction pipeline having an execution unit, a control circuit, and a cache, where the branch predictor is configured to instruct the instruction pipeline to fetch instructions corresponding to a branch window of instructions, the execution unit is configured to send, to the control circuit, branch misprediction information indicating that the branch window is mispredicted, the control circuit is configured to identify, based on the branch misprediction information, a speculative memory access corresponding to the branch window, and the cache includes a cache prefetcher configured to (i) update, based on the identified speculative memory access, a set of memory accesses that is used for cache prefetcher training, and (ii) train on the updated set of memory accesses.

In some examples, updating the set of memory accesses for training by the cache prefetcher further includes filtering out, from the set of memory accesses, the identified speculative memory access. In some examples, the control circuit is configured to identify a branch window identifier corresponding to the branch misprediction information and identify the speculative memory access associated with the branch window identifier using a memory address that corresponds to the identified speculative memory access. In some examples, the cache receives the memory address corresponding to the identified speculative memory access from the control circuit.

In some examples, training the cache prefetcher further includes delaying training until after filtering out the speculative memory access from the set of memory accesses. In the cache prefetcher is configured to (i) copy, prior to training, the set of memory accesses to a prefetcher table, (ii) train on the copied set of memory accesses in the prefetcher table, (iii) update the prefetcher table to filter out, from the copied set of memory accesses, the speculative memory access, and (iv) retrain using the updated set of memory accesses in the prefetcher table.

In some examples, the cache prefetcher is configured to train on a subset of speculative memory accesses in the set of memory accesses based on a heuristic corresponding to at least one of a cache hit ratio from prior speculative memory accesses or a number of cache lines fetched from prior speculative sets of memory accesses.

In one example, a method for using branch misprediction aware cache prefetcher training includes (i) determining, by an instruction pipeline, a mispredicted branch window of instructions, (ii) identifying, by control circuit, a memory access corresponding to the mispredicted branch window, (iii) sending, from the control circuit to a cache that includes from the branch predictor by a cache prefetcher, branch misprediction information corresponding to the mispredicted branch, (iv) updating a set of memory accesses for training the cache prefetcher based on the identified fetch, and (v) training the cache prefetcher using the updated set of memory accesses. In some examples, the method includes identifying the memory access which further includes identifying a branch window identifier corresponding to the branch misprediction information, identifying the memory access associated with the branch window identifier, and identifying a memory address corresponding to the identified memory access.

Features from any of the embodiments described herein can be used in combination with one another in accordance with the general principles described herein. These and other embodiments, features, and advantages will be more fully understood upon reading the following detailed description in conjunction with the accompanying drawings and claims.

The following will provide, with reference to FIGS. 1-9 detailed descriptions of branch misprediction aware cache prefetcher training. Detailed descriptions of example processors are provided in connection with FIGS. 1, 4, and 5. Detailed descriptions of an example processor/instruction pipeline are provided in connection with FIG. 2. Detailed descriptions of diagrams of exemplary branch windows in connection with FIG. 3. Detailed descriptions of example timelines for training a cache prefetcher are provided in connection with FIGS. 6 and 7. Detailed descriptions of block diagram of historical memory accesses for heuristics in connection with FIG. 8. Detailed descriptions of corresponding computer-implemented methods will also be provided in connection with FIG. 9.

FIG. 1 is a block diagram of an example system 100 for branch misprediction aware cache prefetcher training. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, chiplets (e.g., smaller and in some examples more specialized processing units that can coordinate as a single chip), microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, portions of one or more of the same, variations or combinations of one or more of the same, and/or any other suitable physical processor.

In some implementations, the term "instruction" refers to computer code that can be read and executed by a processor. Examples of instructions include, without limitation, macro-instructions (e.g., program code that requires a processor to decode into processor instructions that the processor can directly execute) and micro-operations (e.g., low-level processor instructions that can be decoded from a macro-instruction and that form parts of the macro-instruction).

As further illustrated in FIG. 1, processor 110 includes a cache 160, a cache prefetcher 112, a control circuit 164, and a branch predictor 130. Cache 160 corresponds to a local storage of processor 110 that can include copies of data and/or instructions previously fetched from memory 120 and in some implementations can correspond to a cache hierarchy having multiple levels of caches. For example, cache 160 can store data and/or instructions from memory 120 in response to a request from system 100. Conversely, cache prefetcher 112 can prefetch data from memory 120 prior to a request that has come in from system 100. The term "prefetch" or "prefetching" refers to a technique used by computer processors to fetch instructions and/or data from a main memory to a local memory (e.g., cache 160) before the instructions and/or data are required. Control circuit 164 corresponds to circuitry and/or components that can interface with branch misprediction information for training cache prefetcher 112. Branch predictor 130 can correspond to circuitry for predicting the direction of a branch when it is fetched. An instruction pipeline 101 can include multiple stages to execute instructions for processor 110. As will be described in detail below, instruction pipeline 101 can include an issue/execute stage 116 that executes instructions, which can include evaluating the prediction of branch predictor 130.

Figure 2:
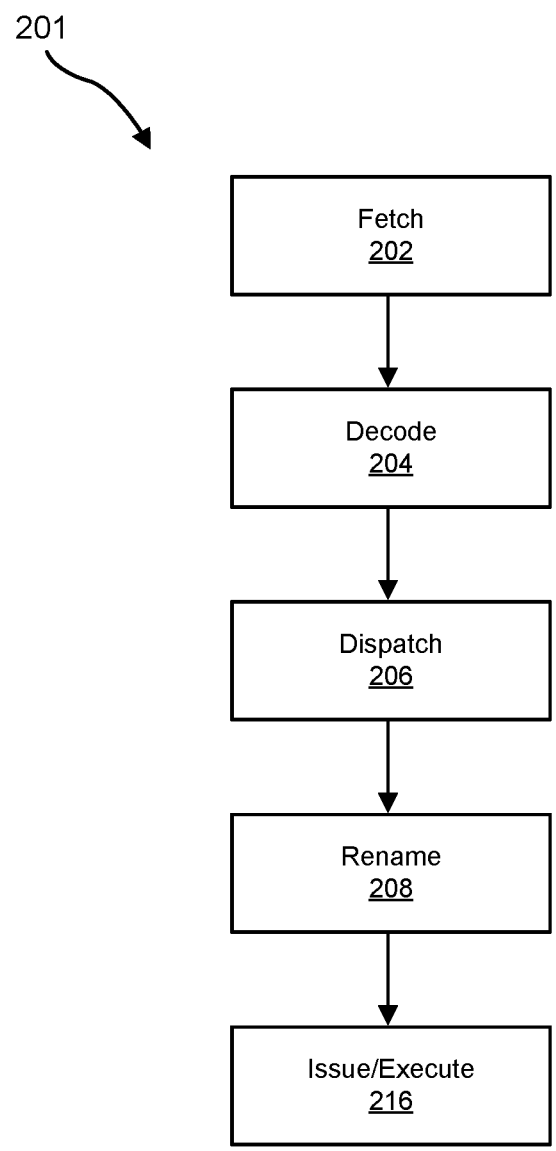
FIG. 2 is a flow diagram of an exemplary instruction pipeline.

FIG. 2 illustrates an exemplary instruction pipeline 201 for a processor, such as processor 110 (and/or a functional unit thereof), for executing instructions. During a fetch stage 202, processor 110 can read program instructions from memory 120. Processor 110 can fetch program instructions based on an active thread or other criteria. In some implementations, multiple instructions can be fetched as a group, such that fetch stage 202 can fetch a fetch window, which can consist of zero or more branch windows (e.g., a fetch window is generated by a branch predictor and can correspond to zero or more branches). At decode stage 204, processor 110 can decode the read program instructions into micro-operations. Processor 110 (and/or a functional unit thereof) can forward the newly decoded micro-operations to a queue that can store micro-operations until they are ready for dispatch. At dispatch stage 206, a scheduler can dispatch one or more micro-operations that are ready for dispatch to the instruction schedulers and instruction window. Furthermore, each instruction in the fetch window can be identified by a unique identifier (e.g., an instruction window ID) and each fetch window that includes N=>1 branches can be further identified by N BWIDs at dispatch stage 206. As used herein, instruction window IDs can uniquely identify a load instruction, a store instruction, and/or a branch at a dispatch stage (e.g., dispatch stage 206). As used herein, branch window identifiers (BWIDs) can uniquely identify the corresponding branch windows including the set of instructions at a fetch stage (e.g., fetch stage 202). At rename stage 208, processor 110 can allocate physical registers to the dispatched micro-operation as needed. An issue/execute stage 216, corresponding to issue/execute stage 116 and/or an execution unit thereof, executes the dispatched micro-operations.

Although FIG. 2 illustrates a basic example instruction pipeline 201, in other examples processor 110 can include additional or fewer stages, perform the stages in various orders, repeat iterations, and/or perform stages in parallel. For instance, as an instruction proceeds through the stages, a next instruction can follow so as not to leave a stage inactive. However, certain instructions (e.g., a branch such as a conditional jump instruction) can change the next instruction depending on a result of executing the instruction (e.g., issue/execute stage 216 executing the conditional jump instruction to determine whether to take the branch). For example, a conditional jump can be "taken" such that the next instruction jumps to a different place in program memory. Alternatively, the conditional jump can be "not taken" such that the next instruction continues with the next instruction in the program memory. In some implementations, a branch predictor (e.g., branch predictor 130) predicts whether the branch will be taken or not taken. Based on the prediction, branch predictor (e.g., branch predictor 130) can accordingly instruct fetch stage 202 to enter the predicted next instruction into the pipeline and issue/execute stage 216 can accordingly execute the predicted instructions. However, if the branch predictor incorrectly predicts the branch (e.g., the conditional evaluates to the other branch than was predicted), this results in a branch misprediction (e.g., predicting the wrong next instruction), as will be described in greater detail with respect to FIG. 3. This branch misprediction can incur overhead because all the stages, as seen in FIG. 2, have been completed for the erroneous instructions and need to be flushed. In doing so, a number of cycles corresponding to instruction pipeline 201 are wasted, and correct new instructions need to be fetched.

Figure 3:
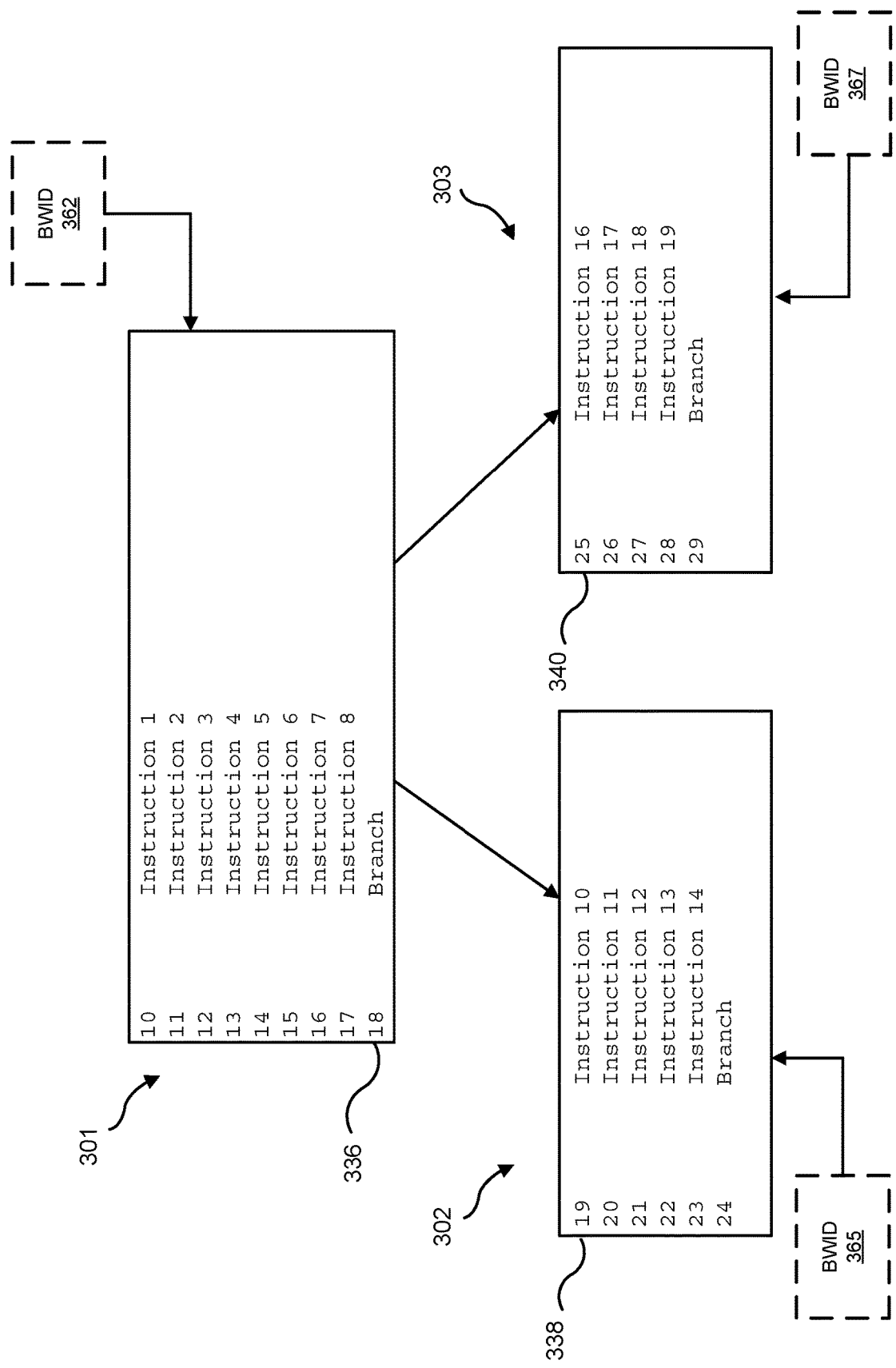
FIG. 3 illustrates diagrams of exemplary branch windows.

FIG. 3 illustrates exemplary branch windows 301, 302, and 303. As used herein, a branch window can generally refer to a set of instructions in between successively executed branches, such as the instructions as seen in branch window 301. Furthermore, branch windows 301, 302, and 303 can have corresponding branch window identifiers (BWIDs) 362, 365, and 367, respectively. In some implementations, branch window 302 can repeat the same set of instructions as branch window 301 (e.g., corresponding to another iteration of a loop), but still have its own unique BWID. Branch window 301 can include a set of instructions including a branch 336 corresponding to line 18. Because the next instruction is unknown until branch 336 is executed (e.g., evaluating the branch at issue/execute stage 216), a branch predictor (e.g., branch predictor 130) can predict whether branch 336 will be taken (e.g., jumping to instruction 340 corresponding to line 25 for fetching) or not taken (e.g., selecting next instruction 338 corresponding to line 19 for fetching). Accordingly, processor 110 can fetch the next instruction as predicted by branch predictor 130. As illustrated in FIG. 3, branch window 302 corresponding to BWID 365 can represent the set of instructions corresponding to the not taken branch, while branch window 303 corresponding to BWID 367 can represent the set of instructions corresponding to the taken branch.

In one specific example, branch 336 can be evaluated as not taken such that the next instruction window corresponds to branch window 302. However, if the branch predictor (e.g., branch predictor 130) previously predicted branch 336 to be taken (e.g., branch window 303), corresponding to the wrong path, instead of not taken (e.g., branch window 302), corresponding to the correct path, the instruction pipeline 201 will be filled with instructions from the wrong path (e.g., instructions from branch window 303). To correct the misprediction, the stages of instruction pipeline 201 corresponding to instructions from the wrong path (which in some implementations can be identified by a BWID or other instruction window identifier) will need to be flushed, wasting a number of cycles corresponding to a number of flushed stages. Because branch predictor 130 incorrectly predicted branch 336 to be taken instead of not taken, branch window 303 represents the wrong set of instructions corresponding to the taken branch whereas branch window 302 represents the correct set of instructions corresponding to the not taken branch. In this manner, all instructions corresponding to the set of instructions in branch window 303 (which can be identified by BWID 367 and/or a corresponding instruction window identifier) need to be flushed and the correct set of instructions corresponding to branch window 302 (which in some examples can later be identified by BWID 367 and/or a corresponding instruction window identifier) will need to be fetched for correct instruction execution.

As part of the instruction execution, a cache (e.g., cache 160) can hold data fetched from memory (e.g., memory 120) as needed for completing a memory access request from processor 110, including memory accesses resulting from instructions in branch windows. As used herein, "memory access" can generally refer to an instruction and/or request to read (e.g., load) or store (e.g., write or modify) data stored in a memory and in some implementations refer to a physical address (PA) of the memory or a virtual address (e.g., a mapping of the physical address). Because memory access requests can result from instructions in branch windows (e.g., branch windows 301, 302, and/or 303), the corresponding BWIDs (e.g., BWID 362, BWID 365, and/or BWID 367, respectively) can be used to identify and/or tag a mispredicted branch window of instructions. In some implementations, such as the example discussed above, if branch 336 is incorrectly predicted as taken instead of not taken, BWID 367 can identify the mispredicted branch window of instructions corresponding to branch window 303. In doing so, the memory accesses associated with the set of instructions corresponding to BWID 367 can be tagged as speculative memory access requests. In some implementations, the cache prefetcher (e.g., cache prefetcher 112) included in the cache (e.g., cache 160) can receive the identified memory access requests corresponding to the mispredicted branch window of instructions.

Figure 4:
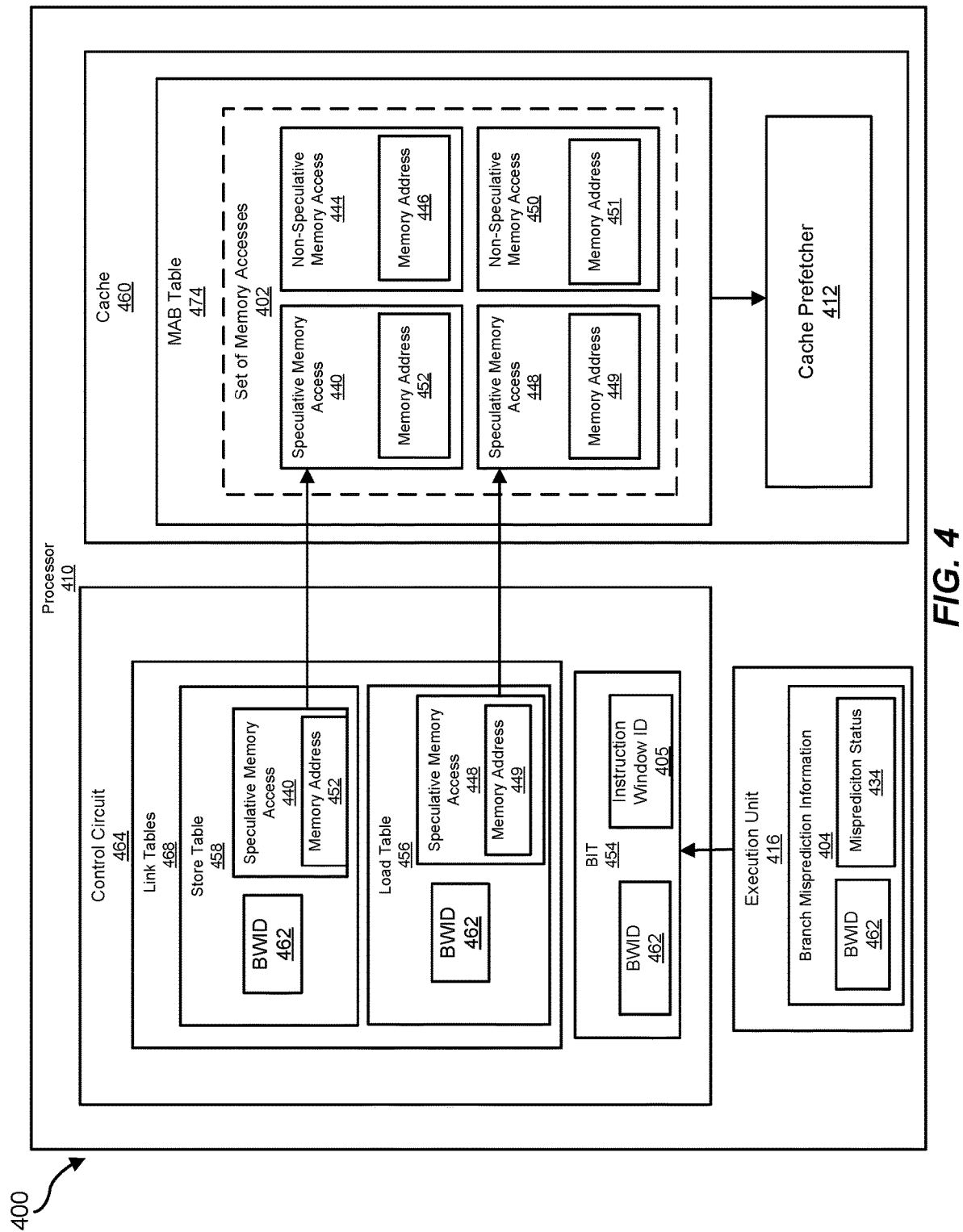
FIG. 4 is a block diagram of an exemplary system for a control circuit receiving branch misprediction information.

FIG. 4 illustrates a system 400, corresponding to system 100, that includes a processor 410 corresponding to processor 110. Processor 410 includes an execution unit 416 corresponding to issue/execute stage 216 and/or issue/execute stage 116, a control circuit 464 corresponding to control circuit 164, a cache 460 corresponding to cache 160, and a cache prefetcher 412 corresponding to cache prefetcher 112. As described earlier with respect to FIG. 2, execution unit 416 can be part of the instruction pipeline 201 for executing the dispatched micro-operations. In some examples, as the instructions travel through the instruction pipeline 201, execution unit 416 can determine branch misprediction information 404 including a BWID 462 corresponding to BWID 362 and a misprediction status 434. In some examples, execution unit 416 evaluates a branch instruction (e.g., branch 336) thereby confirming whether a branch predictor (e.g., branch predictor 130) made an accurate or an inaccurate prediction of the branch instruction. For example, execution unit 416 can evaluate the branch instruction to determine that the actual branch outcome differs from the prediction, thereby confirming the corresponding branch window (e.g., BWID 462) as an inaccurate branch prediction. Accordingly, execution unit 416 can update misprediction status 434 of BWID as mispredicted and send this branch misprediction information (as branch misprediction information 404) to control circuit 464 such that control circuit 464 can identify the mispredicted branch window of instructions.

As described earlier with respect to FIG. 3, memory accesses can include instructions and/or requests that are associated with a branch window identifier (BWID) corresponding to a branch window of instructions. In some implementations, a misprediction status (e.g., misprediction status 434) can identify the memory access as at least one of a speculative memory access, a non-speculative memory access, or an unresolved memory access. Because each BWID can include multiple memory accesses, to further propagate the identification of memory accesses associated with the mispredicted branch window of instructions corresponding to BWID 462, execution unit 416 can send BWID 462 and misprediction status 434 to control circuit 464. Control circuit 464 can include a branch issue table (BIT) 454 and link tables 468. BIT 454 can track issued branch windows by storing each issued BWID (e.g., BWID 462, 362). In some implementations, BIT 454 can be indexed by an instruction window ID 405. As mentioned earlier in FIG. 2, each instruction in a fetch window can be given an instruction window ID, and each fetch window can consist of zero or more branch windows identified by BWIDs, which BIT 454 can track. Correspondingly, BIT 454 can track both an instruction window ID along with the corresponding BWID for an instruction (e.g., load instruction and/or store instruction). In some implementations, multiple instruction window IDs can be part of the same BWID and/or multiple instruction window IDs can be from different BWIDs. Thus, BIT 454 can identify and send the BWID 462 corresponding to the mispredicted branch window of instructions to the link tables 468 using instruction window ID 405.

Link tables 468 can include a load table 456 and a store table 458. Load table 456, also known as the branch load link table (BLLT), includes BWIDs (e.g., BWID 462) and memory addresses (e.g., memory addresses 449 and/or 452) for a load uop (micro-operation). As used herein, "memory addresses" generally refers to unique identifiers that specify locations of data in a memory (e.g., memory 120). A load uop generally refers to a hardware instruction that performs operations related to fetching data from a memory (e.g., memory 120) following dispatch stage 206, as illustrated in FIG. 2. Store table 458, also known as the branch store link table (BSLT), includes BWIDs (e.g., BWID 462) and memory addresses (e.g., memory addresses 449 and/or 452) for a store uop (micro-operation). A store uop generally refers to a hardware instruction that performs operations related to writing data to memory (e.g., memory 120) following dispatch stage 206, as illustrated in FIG. 2.

In some implementations, load table 456 and store table 458 can be sized based on an instruction window size. In some implementations, link tables 468 can be sized based on the average number of branches for a given instruction window size. For example, assuming 1 branch per 6 instructions and an instruction window of 512 entries, either table can be set to 128 entries. In another implementation, both load table 456 and store table 458 can be set-associative (e.g., can be sized to 85 entries such as the previous example) and use the BWID as a search tag in link tables 468. In some implementations, partial flushing of the tables can become a single step process similar to that of flushing an instruction window or the scheduler.

In some implementations, a load queue and a store queue (not illustrated in FIG. 4) can manage load and store operations, respectively. For instance, the load and store queues can queue respective load and store operations until a translation lookaside buffer (TLB) can provide physical addresses for virtual addresses in the queued load/store operations. Although in some implementations the load and store queues can include branch window information (e.g., for associating load/store operations to corresponding BWIDs), FIG. 4 illustrates link table 468 for tracking which load/store operations correspond to which BWIDs (e.g., load table 456 and store table 458, respectively). Further, in some examples, the TLB can also provide physical addresses to link tables 468 for associating BWIDs to physical addresses. Moreover, as each load or store operation includes a memory address, link tables 468 can use the corresponding memory addresses for identifying memory accesses.

Upon the link tables 468 receiving the identified BWID 462 corresponding to the mispredicted branch window of instructions, control circuit 464 can use BWID 462 to identify one or more speculative memory accesses 440 and/or speculative memory accesses 448. In some examples, control circuit 464 can assume that receiving a BWID from execution unit 416 indicates misprediction whereas unreceived BWIDs can indicate unresolved and/or correct predictions. Control circuit 464 can use BWID 462, provided by BIT 454 to link tables 468 (e.g., load table 456 and store table 458) to identify memory accesses associated with BWID 462 (e.g., speculative memory access 440 and speculative memory access 448). Control circuit 464 can send speculative memory access 440 and speculative memory access 448 to cache 460. In some examples, because memory accesses can be identified by corresponding memory addresses, control circuit 464 can send memory address 452 (corresponding to speculative memory access 440) and/or memory address 449 (corresponding to speculative memory access 448) instead of or in addition to speculative memory access 440 and/or speculative memory access 448. In some examples, memory address 452 and/or memory address 449 can correspond to physical addresses, although in other examples can correspond to virtual addresses.

Cache 460 can include a miss address buffer (MAB) table 474, and cache prefetcher 412. As used herein, a "MAB table" can generally refer to a table that keeps track of outstanding cache misses. Cache misses can occur when the requested data for completing a memory access/request is not already in the cache and requires fetching the data from memory (e.g., memory 120). In this manner, MAB table 474 can track a set of memory accesses 402, corresponding to cache misses, for cache prefetcher 412 to train. Cache prefetcher 412 can train on set of memory accesses 402 to determine what data to prefetch. In other words, cache prefetcher 412 can improve the performance of cache 460 by evaluating prior cache misses, and prefetching the corresponding data to prevent the same cache misses in the future.

However, as described above, cache pollution can affect the training of cache prefetcher 412. Without being able to distinguish speculative and non-speculative memory accesses, cache prefetcher 412 can train on speculative memory accesses, which can lead to prefetching data that is not needed (e.g., as the corresponding memory accesses would be from a mispredicted branch that will not actually execute), leading to further cache pollution. To avoid cache prefetcher 412 training on speculative memory accesses, cache 460 can receive branch misprediction information (e.g., as memory addresses, misprediction statuses, etc.) from control circuit 464 to distinguish between speculative and non-speculative memory accesses in MAB table 474.

For example, cache 460 can receive memory address 452 (corresponding to speculative memory access 440) and/or memory address 449 (corresponding to speculative memory access 448) from control circuit 464 (e.g., link tables 468 and more specifically store table 458 and load table 456, respectively). Because the tracked cache misses include memory addresses, MAB table 474 can track memory accesses based on corresponding memory addresses, similar to link tables 468 as described above. Although MAB table 474 can track cache misses using physical addresses, in some examples MAB table 474 can track cache misses using virtual addresses. Accordingly, cache 460 (e.g., cache prefetcher 412) can identify which memory accesses in the set of memory accesses 402 correspond to speculative memory accesses, based on the received memory addresses (e.g., speculative memory access 440 from receiving memory address 452 and/or speculative memory access 448 from receiving memory address 449). By not receiving memory address 446 or memory address 451, cache prefetcher 412 can also identify non-speculative memory access 444 and non-speculative memory access 450.

In some implementations, cache prefetcher 412 can update set of memory accesses 402 for training, for instance by filtering out speculative memory accesses (e.g., speculative memory access 440 and speculative memory access 448) to train on non-speculative memory accesses (e.g., non-speculative memory access 444 and non-speculative memory access 450). Accordingly, cache prefetcher 412 can reduce training on memory accesses from mispredicted instructions and increase a likelihood of prefetching data that will be used, improving a performance of cache prefetcher 412 and cache 460 (e.g., by reducing cache misses).

Although the examples herein describe control circuit 464 sending memory addresses of speculative memory accesses, in other examples control circuit 464 can send other identifying information to identify speculative memory accesses. In addition, in some examples, control circuit 464 can send memory addresses (and/or other identifying information) of memory accesses along with corresponding misprediction status information confirming whether the corresponding memory access is speculative, non-speculative, unresolved, etc. For example, control circuit 464 can send memory address 446 with misprediction status confirming the non-speculative status such that cache 460 can further confirm that non-speculative memory access 44 is indeed non-speculative. Moreover, FIG. 4 illustrates an example in which control circuit 464 can be implemented with and/or near an instruction pipeline. In other examples, the control circuit can be implemented with and/or near the cache, as will be described further with respect to FIG. 5.

Figure 5:
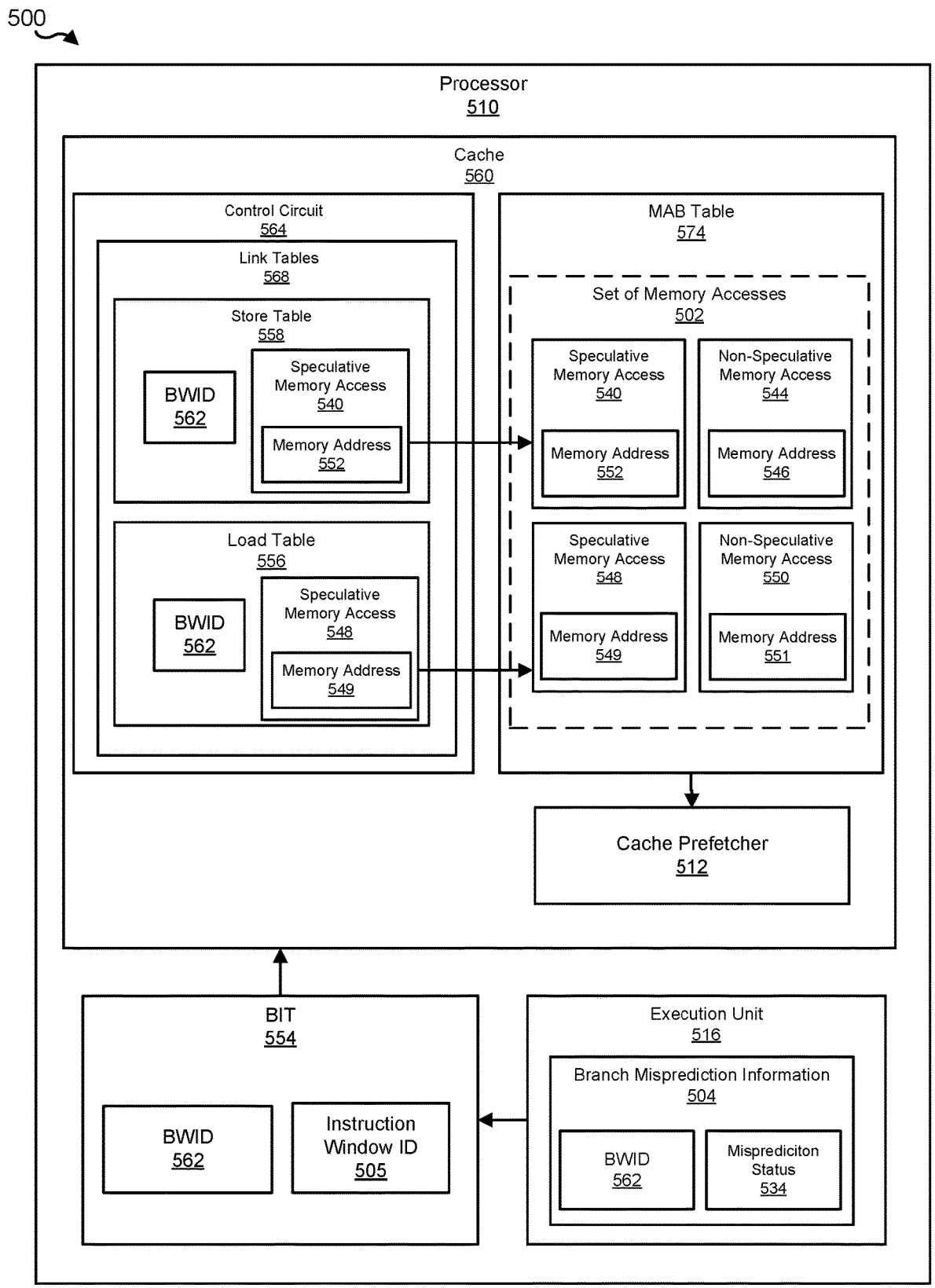
FIG. 5 is a block diagram of an exemplary system for a cache receiving branch misprediction information.

FIG. 5 illustrates a system 500, corresponding to system 400 and/or system 100, that includes a processor 510 corresponding to processor 410 and/or processor 110. Processor 510 includes an execution unit 516 corresponding to execution unit 416 (further corresponding to issue/execute stage 216 and/or issue/execute stage 116), a control circuit 564 corresponding to control circuit 464 (and further corresponding to control circuit 164), a cache 560 corresponding to cache 460 (and further corresponding to cache 160), and a cache prefetcher 512 corresponding to cache prefetcher 412 (and further corresponding to cache prefetcher 112). As described earlier with respect to FIG. 4, execution unit 516 can evaluate a branch instruction (e.g., branch 336) to determine branch misprediction information 504, corresponding to branch misprediction information 404, that further includes a BWID 562 corresponding to BWID 462 and/or BWID 362 and a misprediction status 534 corresponding to misprediction status 434, upon confirming an inaccurate prediction from the branch predictor (e.g., branch predictor 130).

As illustrated in FIG. 5, a BIT 554 corresponding to BIT 454 can receive branch misprediction information 504 (e.g., as BWID 562 and misprediction status 534) from execution unit 516. Similar to BIT 454 described earlier with respect to FIG. 4, BIT 554 can be indexed by an instruction window ID 505 (corresponding to instruction window ID 405) such that BIT 554 can track instructions along with their branch window IDs (BWIDs). Thus, BIT 554 can identify and send BWID 562 corresponding to the mispredicted branch window of instructions to link tables 568 (corresponding to link tables 468) located at cache 560.

In some implementations, cache 560 can include control circuit 564, an MAB table 574 (corresponding to MAB table 474), and a cache prefetcher 512 (corresponding to cache prefetcher 412). In doing so, control circuit 564, including link tables 568, can be implemented at cache 560 rather than near execution unit 516 (e.g., as in FIG. 4). As illustrated in FIG. 5, link tables 568, including a load table 556 corresponding to load table 456 and a store table 558 corresponding to store table 458, can be located at cache 560. In some implementations, to avoid the area and power costs of extra interconnects between the control circuit (e.g., control circuit 464) and cache (e.g., cache 460) as illustrated in FIG. 4, link tables 568 can be replicated (e.g., via separate structures and/or stored in reserved portions) at each level in the cache 560 hierarchy (not shown in drawings).

In some examples, to house all the corresponding components such as the link tables 568 as described above, a system (system e.g., 500) can be designed such that a cache (e.g., cache 560) comprises a large portion of the processor (e.g., processor 510). In some examples, control circuit 564 can be implemented near cache 560. For example, while not local to cache 560, control circuit 564 can be placed near cache 560 to reduce a distance for sending branch misprediction information (e.g., branch misprediction information 504) to cache 560. In some examples, BIT 554 can be implemented at and/or near cache 560. In some implementations, the load and store queues (not illustrated in FIG. 5) can store operations until the TLB, located near and/or at cache 560 in some implementations, can provide physical addresses for virtual addresses of the queued load/store operations.

Upon the link tables 568 receiving the identified BWID 562 corresponding to the mispredicted branch window of instructions, cache 560 can use BWID 562 to identify a speculative memory access 540 (corresponding to speculative memory access 440) and/or a speculative memory access 548 (corresponding to speculative memory access 448). In some examples, cache 560 can assume that receiving a BWID from BIT 554 and/or execution unit 516 indicates misprediction whereas unreceived BWIDs can indicate unresolved and/or correct predictions. For instance, control circuit 564 can find, in link tables 568 (and more specifically in store table 558 and/or load table 556), memory accesses associated with BWID 562. Accordingly, cache 560 can use BWID 562, provided by BIT 554 to link tables 568 (e.g., load table 556 and store table 558) to identify and in some implementations tag memory addresses associated with memory accesses that correspond with BWID 562 (e.g., speculative memory access 540 and speculative memory access 548 corresponding memory address 552 and memory address 549).

As illustrated in FIG. 5, cache 560 can utilize control circuit 564 to send identified speculative memory access 540 and speculative memory access 548 to MAB table 574. In some examples, because memory accesses can be identified by corresponding memory addresses, control circuit 564 can send memory address 552 (corresponding to memory address 452), that identifies speculative memory access 540, and/or memory address 549 (corresponding to memory address 449), that identifies speculative memory access 548, instead of or in addition to speculative memory access 540 and/or speculative memory access 548. In some examples, memory address 552 and/or memory address 549 can correspond to physical addresses, although in other examples can correspond to virtual addresses.

Similar to MAB table 474, MAB table 574 can track cache misses as represented by a set of memory accesses 502, corresponding to set of memory accesses 402, for cache prefetcher 512 to train. Cache prefetcher 512 can improve the performance of cache 560 by evaluating prior cache misses, and prefetching the corresponding data to prevent the same cache misses in the future. However, as described previously, cache prefetcher 512 not being able to distinguish between speculative and non-speculative memory accesses can cause cache prefetcher 512 to prefetch data that is not later needed. To avoid cache prefetcher 512 from training on speculative memory accesses, cache 560 can utilize control circuit 564 to receive and send branch misprediction information (e.g., as memory addresses, misprediction statuses, etc.) to MAB table 574, such that cache prefetcher 512 can distinguish between speculative and non-speculative memory accesses.

In some implementations, each MAB entry can include a branch outcome (BO) bit that tracks the outcome of the originally speculated branch. In some implementations, the BO-bit is initialized to '0' which indicates that the branch is not resolved, or the branch outcome is resolved, and the original prediction is accurate. In some implementations, the BO-bit can be set to '1' to indicate that the branch is mispredicted.

A Branch Outcome Signal (BOS) as described herein corresponds to a hardware flow that marks physical addresses (PAs) and can be installed in caches or in flight in the cache hierarchy, as issued under a mispredicted branch window. Since more than one memory instruction can be issued in the shadow of a mispredicted branch, the BOS can mark multiple PAS under a single branch misprediction event. In some implementations, if multiple mispredicted branches resolve in the same cycle, only the oldest (in program order) mispredicted branch can issue a BOS to mark PAs. The BOS can use the global BWID (GBWID) (e.g., a BWID that can track branch windows of more than one thread by assigning unique identifiers across the threads) of the oldest mispredicted branch along with a count of the number of GBWIDs issued in the shadow of the oldest mispredicted branch to probe BSLT and BLLT and identify the PAs to be marked. Using this count (e.g., a Flush Counter), all PAs tracked in the BLLT and BSLT tables with a GBWID equal or higher than that of the oldest mispredicted branch and less than (GBWID+FlushCounter) % instruction window size, can be marked as speculative. This flow can therefore cover all PAs issued under BWIDs younger than the oldest mispredicted branch.

The BOS can be used to find the PAs accessed under the shadow of a mispredicted branch by accessing the BSLT and BLLT and sets the BO-bit for those PAs in every MAB entry (if the miss to the PA is pending) and preselected cache(s) (if the data fetched under the wrong path has been installed in the cache). A BO-bit set to '1' can indicate that the data access originated under a mispredicted branch. The BOS can mark PAs as speculative, in one, all or some levels of the cache hierarchy.

The BLLT and BSLT can be looked up in parallel starting with the mispredicted branch GBWID. In some implementations the BLLT and/or BSLT can be set-associative, such that the GBWID can be used to look up the specific set they map to and track the PAs to be marked as speculative. This process can continue sequentially for all tables sets (up to FlushCounter) with indices ranging from (GBWID+1) % instruction window size until (GBWID+FlushCounter) % instruction window size.

If the tables (e.g., BLLT and/or BSLT) are fully associative, then the entries matching the GBWIDs in the window [GBWID, (GBWID+FlushCounter) % instruction window size] can send their PAs to a queue, which in some implementations can require one or more cycles to complete.

All PAs can enter a queue and then send to the MAB pool and the caches to check for address matches. The corresponding BLLT and BSLT entries can subsequently be invalidated.

As used herein, GBWID can generally refer to a BWID that, in some implementations, has been enhanced with hardware threadId bits in the most significant bit (MSB) positions for simultaneous multithreading (SMT). As used herein, SMT can generally refer to a form of multithreading that seamlessly interleaves the processing of instructions from multiple threads of execution in a single, shared instruction pipeline (e.g., instruction pipeline 201). In some implementations, the GBWID can flush only entries in a store table (e.g., store table 558) and a load table (e.g., load table 556) that correspond to the same thread (assuming both tables are indexed by the GBWID). In some implementations, a shared memory address can exist in "N" different entries in the store and load tables if the core supports "N-way SMT." In some implementations, if the memory address is fetched by M threads (where M<=N) speculatively, then the memory address can be designated as speculative if all M threads speculatively fetched the memory address. In some implementations, if the memory address is fetched by M threads speculatively, then the memory address can be designated speculative if at least one thread fetched it speculatively.

In some examples, using a given BWID (e.g., BWID 562), which in some examples can correspond to the oldest GBWID of the oldest mispredicted branch and can be provided via the branch outcome signal (BOS), the control circuit (e.g., 564) can identify a speculative memory address corresponding to a mispredicted branch.

Hence, receiving the branch misprediction information (e.g., branch misprediction information 504) can improve prefetcher training because the cache prefetcher (e.g., cache prefetcher 512) can make well informed decisions based on the identified speculative and non-speculative memory accesses. However, receiving the branch misprediction information can require waiting for the execution unit (e.g., execution unit 516) to update and send the misprediction status (e.g., misprediction status 534) to the control circuit (e.g., control circuit 564). Therefore, in some implementations, in order to take advantage of the branch misprediction information, the cache prefetcher can delay training until receiving the branch misprediction information.

Figure 6:
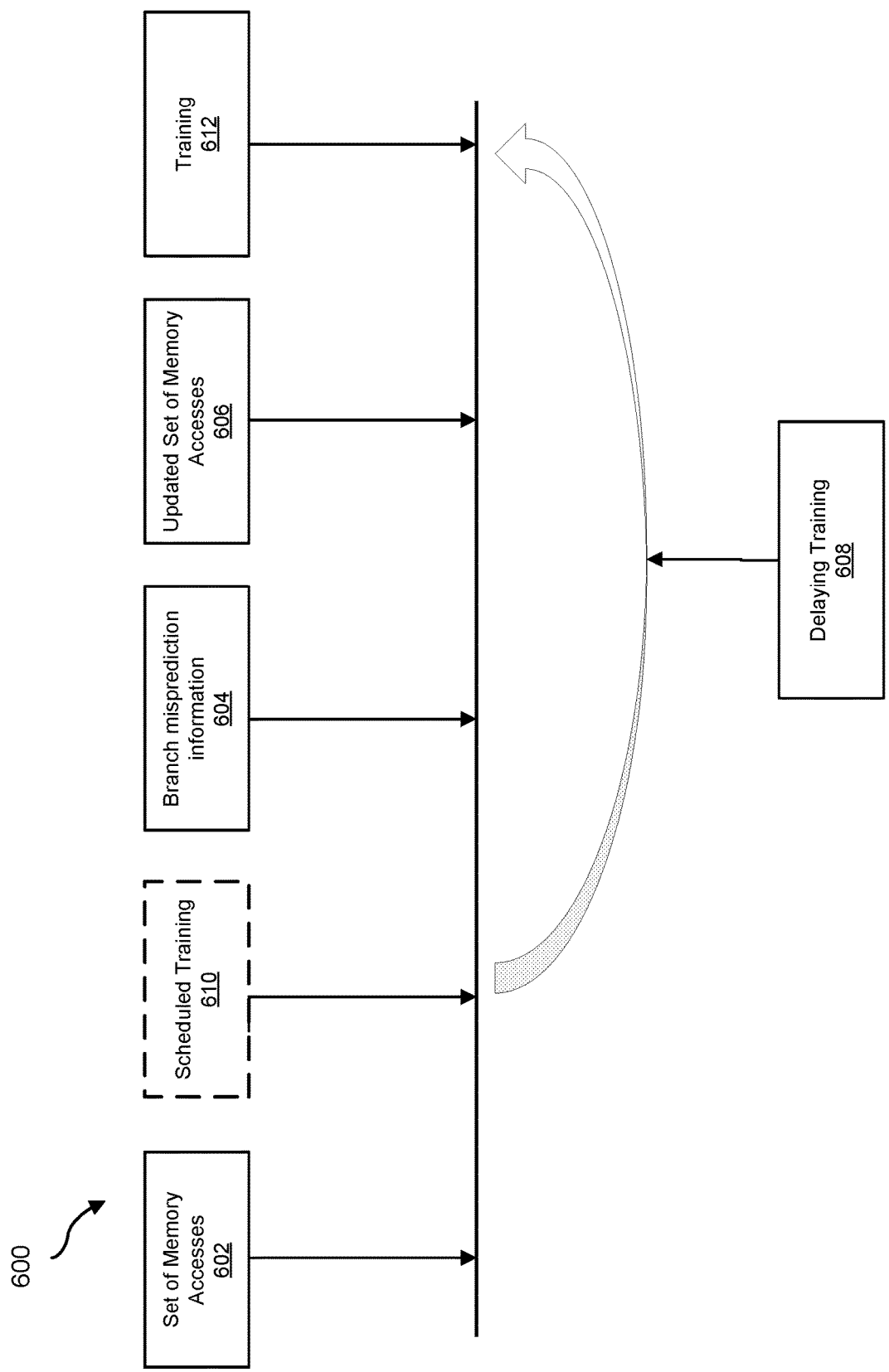
FIG. 6 is a diagram of an exemplary timeline for delaying a training of the cache prefetcher for a set of updated fetches.

Turning to FIG. 6, FIG. 6 illustrates a timeline 600 corresponding to a delay in training 608 of a cache prefetcher (e.g., cache prefetcher 512) until branch misprediction information 604 (corresponding to branch misprediction information 504 and/or branch misprediction information 404) is received for updating a set of memory accesses 602. In some implementations, a cache prefetcher can train using set of memory accesses 602 (corresponding to set of memory accesses 502 and/or set of memory accesses 502) at a scheduled training 610 (e.g., representing a normal workflow for cache prefetcher training without branch misprediction information). However, as described herein, set of memory accesses 602 can include speculative memory accesses (e.g., speculative memory access 540 and/or 548) that can only be identified once the execution unit (e.g., execution unit 516) evaluates the branch instruction to confirm an inaccurate prediction and sends the branch misprediction information 604 to the control circuit (e.g., control circuit 564). Hence, cache prefetching performance can be negatively affected by the cache prefetcher being unaware of branch misprediction information 604 as described herein.

In some implementations, the cache prefetcher can delay training 608 until the branch misprediction information 604 is received by the control circuit (e.g., control circuit 564) and sent to the cache (e.g., cache 560) for updating a set of memory accesses 602. In some implementations, branch misprediction information 604 can include a BWID (e.g., BWID 562) corresponding to a mispredicted branch window of instructions and an updated misprediction status (e.g., misprediction status 534) to identify speculative memory accesses (e.g., speculative memory access 540 and/or 548) corresponding to the BWID. In some implementations, the misprediction status can identify the memory access as at least one of a speculative memory access, a non-speculative memory access, or an unresolved memory access. In this manner, it can be helpful to delay training 608 of the cache prefetcher until the misprediction status corresponding to branch misprediction information 604 has been received by the cache (and more specifically the cache prefetcher). In some examples, the misprediction status can be received by the cache, when the control circuit is implemented at the cache, as illustrated in FIG. 5. In some examples, upon sending the identified memory access to the cache, (e.g., cache 560), the cache prefetcher (e.g., cache prefetcher 512) can update a set of memory accesses 602 to reflect an updated set of memory accesses 606 for cache prefetcher training 612.

In some examples, because of the delay in training, the cache prefetcher can filter out speculative memory accesses (e.g., speculative memory accesses 540 and/or 548), corresponding to the received branch misprediction information 604 to create an updated set of memory accesses 606 for cache prefetcher training 612. In other words, the cache prefetcher can train on the updated set of memory accesses that includes non-speculative memory addresses (e.g., non-speculative memory accesses 544 and/or 550) and excludes speculative memory accesses. In some implementations, the received branch misprediction information 604 can also include memory addresses (e.g., memory addresses 552, 546, 549, and/or 551), corresponding to the speculative memory accesses (e.g., speculative memory access 540 and/or 548) as will be described further below. In some examples, the cache prefetcher can filter out speculative memory addresses in the set of memory accesses because a MAB table (e.g., MAB table 574) can track memory accesses corresponding to the memory addresses.

Furthermore, as described with respect to FIGS. 4 and 5, load and store queues can queue respective load and store operations until a translation lookaside buffer (TLB) can provide physical addresses for virtual addresses in the queued load/store operations. As described earlier, a branch outcome bit can identify whether a physical address corresponds to a mispredicted branch or is otherwise unresolved or confirmed non-speculative. For example, a branch outcome bit set to "1" can indicate that the memory address belongs to a mispredicted branch. Hence, updated set of memory accesses 606 can reflect updated branch outcome bit values and the cache prefetcher can filter out speculative memory accesses from set of memory accesses 602 for training 612 by ignoring memory addresses having their branch outcome bit set to "1." In another example, a branch outcome bit set to "0" can indicate that the status is still unknown and/or the physical address is confirmed non-speculative. In some implementations, the branch outcome bit set to "0" can indicate a memory access that is part of an instruction fetch (e.g., branch window of instructions) following a pipe redirection and hence is a non-speculative memory address. In some implementations, the branch outcome bit set to "0" can indicate a memory access that is part of a branch that resolved, is the oldest in the instruction window and is accurately predicted by the branch predictor, or otherwise indicate that the data has been fetched in the correct path. In some implementations, the branch outcome for a memory access is not resolved (e.g., is part of a branch that is not yet resolved) so the status of the memory access is unknown. In these instances, set of memory accesses 606 and the corresponding memory addresses can be configured to retain the memory accesses because they are deemed as non-speculative memory accesses and can potentially be useful for cache prefetcher training 612.

In some examples, the execution unit that evaluates a branch instruction, where the branch predictor (e.g., branch predictor 130) made an accurate prediction, a status and a BWID of the correctly predicted branch window of instructions can be sent to the control circuit with a delay because of other instructions that consume execution unit bandwidth. This delay can be detrimental for training 608 of the cache prefetcher and impact the timeliness of the cache prefetcher. However, because it is not known whether the branch predictor makes an accurate or an inaccurate prediction until the execution unit evaluates the instruction, which can correspond to an indeterminate and/or variable number of cycles, it can be helpful to continue training on a set of memory accesses rather than wait indefinitely and/or train irregularly. In some implementations, if there is a branch misprediction, even after the cache prefetcher has previously trained on the set of memory accesses (including newly resolved speculative memory accesses), cache prefetcher can retrain using an updated set of fetches in response to receiving the branch misprediction information. In this manner, cache prefetcher can continue training on the set of memory accesses (e.g., accordingly to a normal workflow) without affecting the timeliness of the prefetcher in waiting for the branch misprediction information, as will be described further with respect to FIG. 7.

Figure 7:
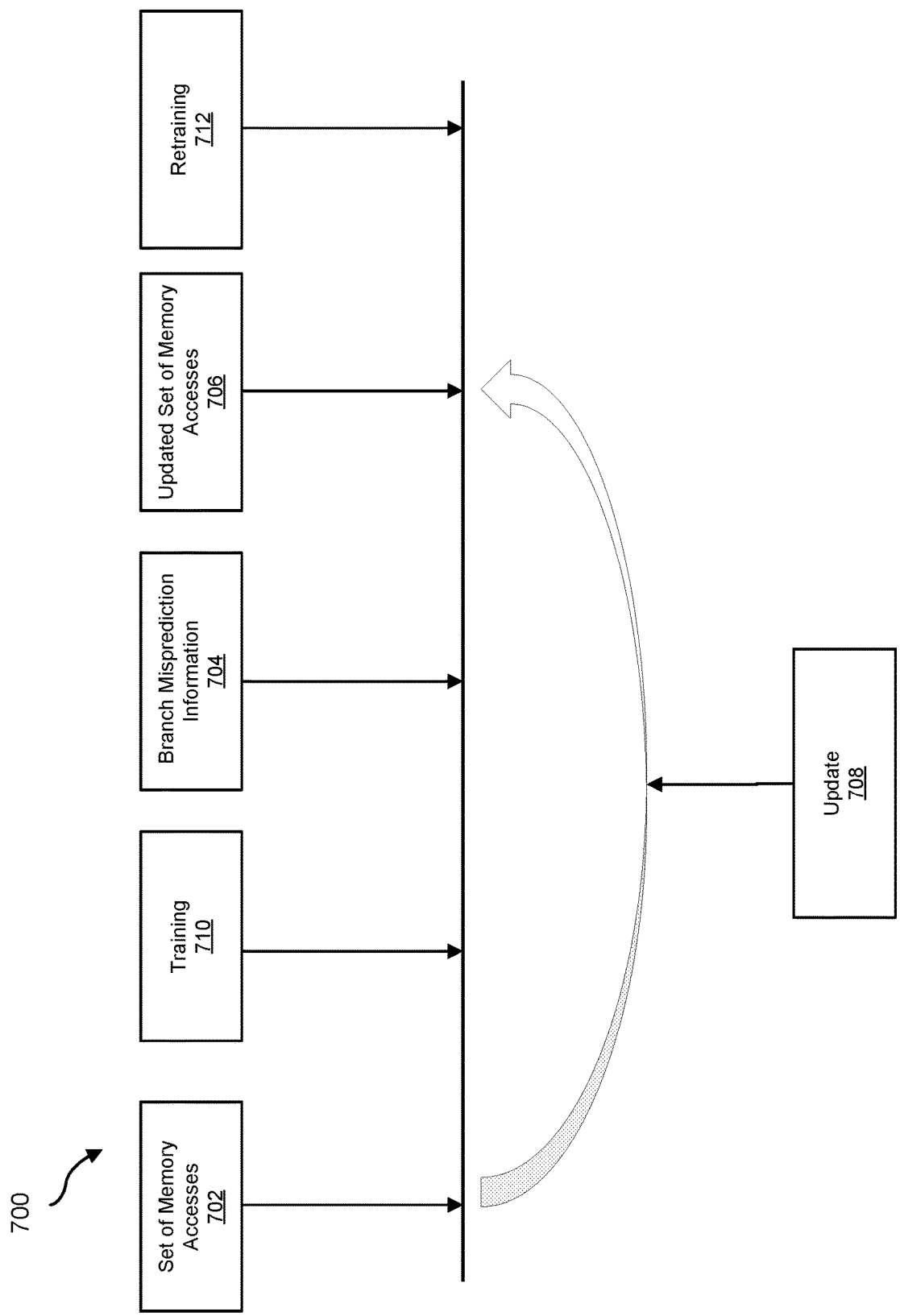
FIG. 7 is a diagram of an exemplary timeline for retraining the cache prefetcher for a set of updated fetches.

FIG. 7 illustrates a timeline 700 corresponding to retraining 712 a cache prefetcher (e.g., cache prefetcher 512), in response to receiving a branch misprediction information 704 (corresponding to branch misprediction information 604, branch misprediction information 504, and/or branch misprediction information 404) to update 708 a set of memory accesses 702. In some implementations, a cache prefetcher can train using set of memory accesses 702 (corresponding to set of memory accesses 602, set of memory accesses 502, and/or set of memory accesses 402) at a training 710 (corresponding to scheduled training 610). However, as mentioned with respect to FIG. 6, cache prefetching performance can be negatively affected by the cache prefetcher being trained late with branch misprediction information 704.

In some implementations, the cache prefetcher can retrain 712 upon receiving the branch misprediction information 704 as opposed to delaying training 608 to wait for the branch misprediction information, as seen with respect to FIG. 6. For example, set of memory accesses 702 is copied to a prefetcher table (e.g., a data structure used by the cache prefetcher for holding a training data set), such that the cache prefetcher trains on set of memory accesses 702 at training 710 using the copied set of memory accesses (e.g., set of memory accesses 702 in the prefetcher table). Upon receiving branch misprediction information 704, specifically a misprediction status (e.g., misprediction status 534), from an execution unit (e.g., execution unit 516), the cache prefetcher can update the copied set of memory accesses in the prefetcher table at update 708. At update 708, the cache prefetcher can filter out, from the copied set of memory accesses in the prefetcher table, a speculative memory access (e.g., speculative memory accesses 540 and/or 548) to reflect an updated set of memory accesses 706, reflecting the received branch misprediction information 704. In doing so, the cache prefetcher can use the updated set of memory accesses 706 in the prefetcher table for retraining 712 the cache prefetcher. As described herein, updated set of memory accesses 706 can correspond to set of memory accesses 702 having speculative memory accesses expressly filtered out (e.g., removed from the prefetcher table) and/or can correspond to having speculative memory accesses being tagged as speculative for the cache prefetcher to ignore for training.

In some implementations, a snapshot, corresponding to set of memory accesses 702 copied to the prefetcher table after training 710, can be taken prior to receiving branch misprediction information 704. In some examples, a prefetch snapshot table (PST) can store the snapshot as metadata along with the corresponding GBWID of the PA. In some implementations, the cache prefetcher can use the memory addresses communicated from the BOS along with the GBWID of a resolved branch to look up the PST and update corresponding prefetcher table entries if the memory addresses under the GBWID have been found to be speculative. In some implementations, if the oldest branch in the instruction window resolves and is found to be correctly predicted, the BOS can invalidate all PST entries corresponding to prefetcher table snapshots corresponding to prefetcher table snapshots copied to the prefetcher table before an update of a given memory address with the GBWID of the correctly predicted branch. In this instance, the corresponding PST entries can be marked as resolved, but no action is taken with respect to retraining 712 the cache prefetcher (e.g., as already being trained on). In other words, once the oldest branch is resolved and found to be correctly predicted, the PST entries marked as resolved can be invalidated.

In some implementations, multiple cache prefetchers can operate in tandem at a given cache level. In this manner, because memory addresses corresponding to memory accesses can train multiple prefetchers at a cache level, it can be possible to have multiple PSTs, one per prefetcher type, which can store the original state of a trained entry before it is trained by the memory address. In some implementations, a PST can also be implemented with each memory address storing the original trained entry state in a separate set. In doing so, the PST can be looked up multiple times for a given memory address with prefetcher type bits located in the higher order most significant bit (MSB) bits. In some examples, the tag encompassing the prefetcher type and the memory address can indicate the trained prefetcher entry with the memory address.

In some implementations, it can also be helpful to train a cache prefetcher using speculative memory accesses (e.g., speculative memory accesses 440 and/or 448) based on observing previous set of memory accesses (e.g., set of memory accesses).

Figure 8:
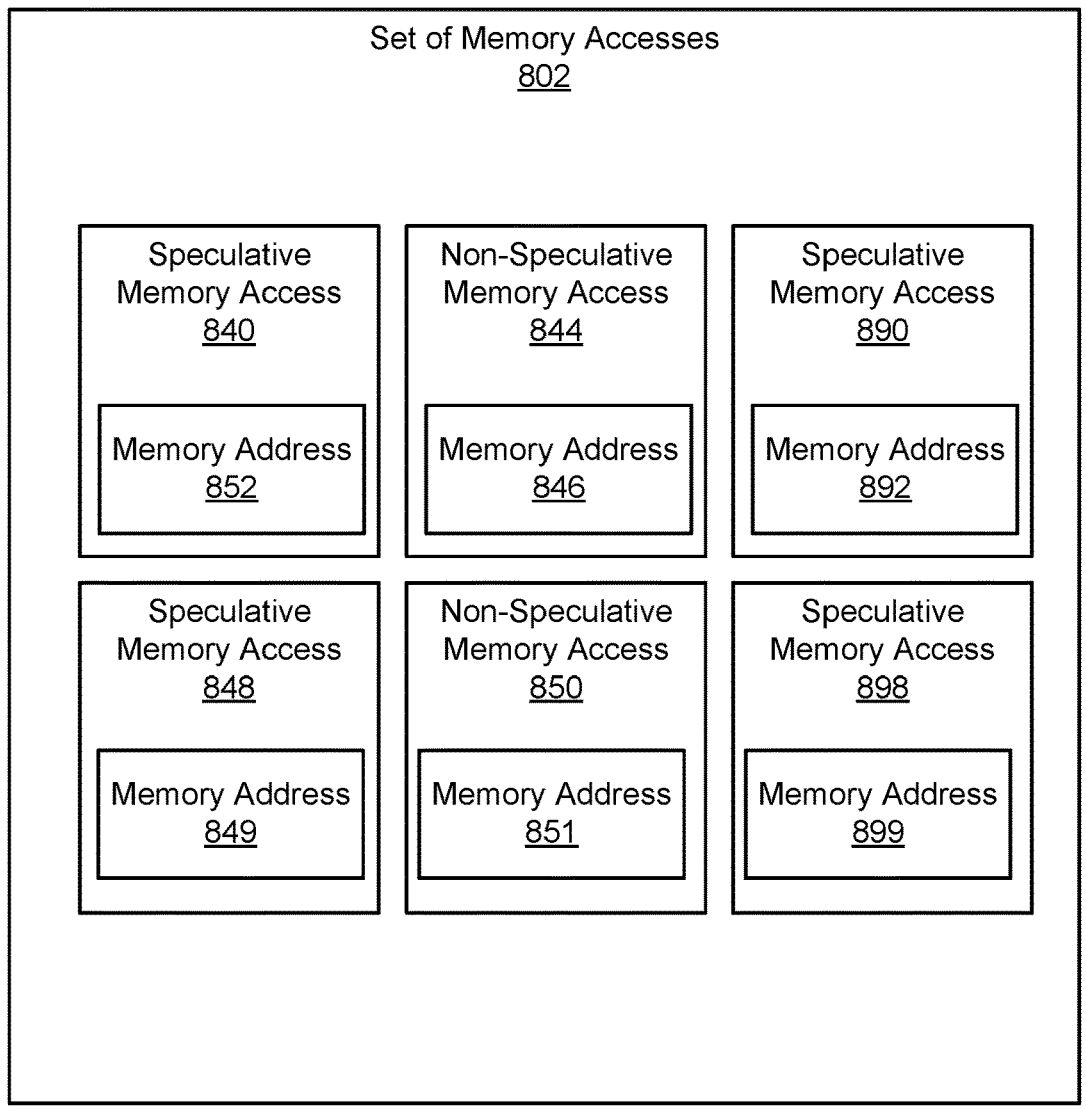
FIG. 8 is a block diagram of historical memory accesses for heuristics.

Turning to FIG. 8, FIG. 8, illustrates a block diagram 800 of a historical set of memory accesses 802 corresponding to a set of memory accesses (as described herein) that has already been resolved such that it can be analyzed based on heuristics. Set of memory accesses 802 can include a speculative memory access 840 (corresponding to a speculative memory access described herein) having a memory address 852, a speculative memory access 848 (corresponding to a speculative memory access described herein) having a memory address 849, a non-speculative memory access 844 (corresponding to a non-speculative memory access described herein) having a memory address 846, a non-speculative memory access 850 (corresponding to a non-speculative memory access described herein) having a memory address 851, a speculative memory access 890 (corresponding to a speculative memory access described herein) having a memory address 892, and a speculative memory access 898 (corresponding to a speculative memory access described herein) having a memory address 899. In some implementations, it can be useful to train cache prefetcher (e.g., cache prefetcher 512) using a subset of speculative memory accesses (e.g., speculative memory access 540) in set of memory accesses 502. For example, a heuristic corresponding to observing a cache hit ratio detailing cache hits of prior speculative memory accesses 840, 848, 890, and/or 898, in set of memory accesses 802, over a period of cycles, can determine whether speculative memory access 540 and/or speculative memory access 548 can be useful for training the cache prefetcher. In one example, cache prefetcher (e.g., cache prefetcher 512) can train using one or more memory accesses from mispredicted branches (e.g., speculative memory access 540 and/or speculative memory access 548) in response to the cache hit ratio exceeding a cache hit ratio threshold. In some implementations, the cache hit ratio threshold can correspond to an acceptable cache hit ratio performance level from prefetcher training using speculative memory accesses such that cache prefetcher training using speculative memory accesses can continue. For example, the cache hit ratio threshold can be 75% or other appropriate value (e.g., corresponding to three hits out of four speculative memory accesses 840, 848, 890, and 898 from set of memory accesses 802 in FIG. 8). In other words, if a speculative branch window of instructions resulted in memory accesses satisfying the cache hit ratio threshold (e.g., 3 out of 4 in FIG. 8), then the speculative memory accesses were ultimately useful such that it can be useful to continue training on at least a subset of speculative memory accesses. In some examples, if the cache hit ratio falls below the cache hit ratio, cache prefetcher (e.g., cache prefetcher 512) can stop training on speculative fetches as described herein.

In further examples, a heuristic corresponding to observing a number of cache lines fetched from prior speculative sets of fetches (e.g., set of memory accesses 802) can determine whether speculative memory access 540 and/or speculative memory access 548 can be useful for training cache prefetcher 512. For instance, a percent of cache lines fetched from a set of memory accesses 802, can be applied for selectively training on speculative memory accesses (e.g., keeping a same or similar percent of speculative memory accesses in set of memory accesses 502 for cache prefetcher training). In one example, if approximately 50% (or other appropriate percent and/or represented by a number of cache lines) of the cache lines from set of memory accesses 802 were fetched, cache prefetcher 512 can train using approximately 50% of the speculative memory accesses in set of memory accesses 502 (e.g., training on speculative memory access 540, and not speculative memory access 548). In some examples, in response to the number of cache lines fetched from the prior speculative set of memory accesses (e.g., set of memory accesses 802) exceeding a cache line threshold for speculative memory access 548, cache prefetcher 512 can train on all or a subset of the speculative memory accesses by retaining the speculative memory accesses in set of memory accesses 502. In other words, the cache line threshold can correspond to an acceptable success rate of speculative memory accesses resulting in actual use (e.g., by another instruction).

In some implementations, retaining speculative memory accesses for training can include ignoring the speculative tag/identification for an appropriate number of speculative memory accesses, and/or selecting certain speculative memory accesses to include for training (e.g., selected based on recency, order, and/or the heuristics described herein). Moreover, in some examples, particularly when all speculative memory accesses are to be retained for training, certain aspects described herein can be canceled, such as delaying training 608 described with respect to FIG. 6, and/or retraining 712 described with respect to FIG. 7.

Figure 9:
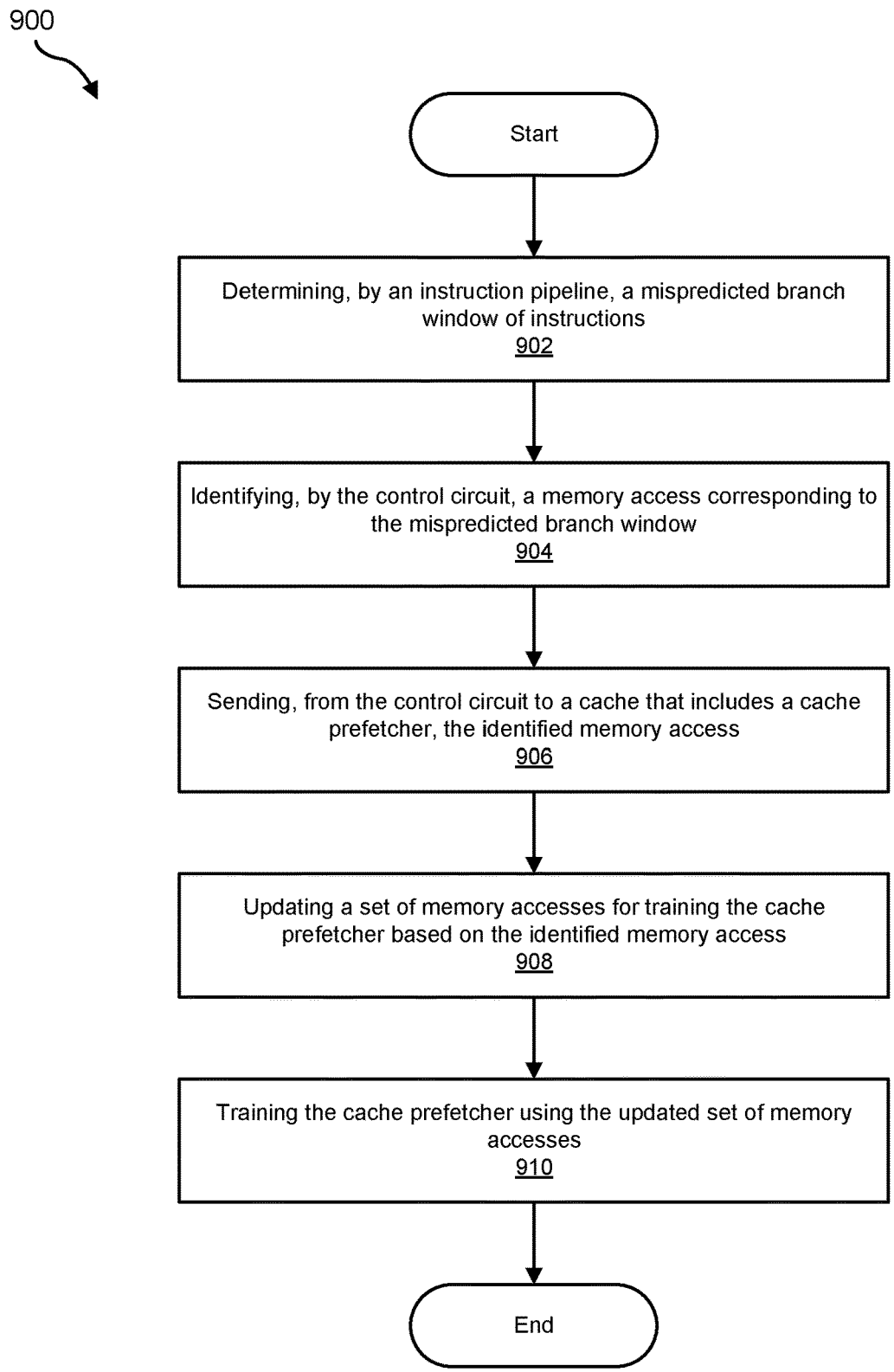
FIG. 9 is a flow diagram of an exemplary method for branch misprediction aware cache prefetcher training.

FIG. 9 is a flow diagram of an exemplary method 900 for branch misprediction aware cache prefetcher training. The steps shown in FIG. 9 can be performed by any suitable circuit, computer-executable code and/or computing system, including the system(s) illustrated in FIGS. 1, 4, and/or 5. In one example, each of the steps shown in FIG. 9 represent an algorithm whose structure includes and/or is represented by multiple sub-steps, examples of which will be provided in greater detail below.

As illustrated in FIG. 9, at step 902 one or more of the systems described herein, determine, by an instruction pipeline, a mispredicted branch window of instructions. For example, execution stage 116 can evaluate a branch instruction to determine that branch predictor 130 made an inaccurate prediction of the branch instruction and send branch misprediction information 404 to a control circuit 464.

At step 904, one or more of the systems described herein, identify, by the control circuit, a memory access corresponding the mispredicted branch window. For example, control circuit 464 can receive branch misprediction information 404 and identify speculative memory accesses 440 and/or 448. In further examples, identifying speculative memory accesses 440 and/or 448 can include identifying a BWID 462 corresponding to the branch misprediction information 404, identifying the speculative memory accesses 440 and/or 448 associated with BWID 462, and identifying memory addresses 452 and/or 449 corresponding to the identified speculative memory accesses 440 and/or 448.

At step 906, one or more of the systems described herein, send, from the control circuit to a cache that includes a cache prefetcher, the identified memory access. For example, control circuit 464 can send to cache 460 an identified memory access, or more specifically, an identified speculative memory access 440.

At step 908, one or more of the systems described herein, update a set of memory accesses for training the cache prefetcher based on the identified memory access. For example, cache prefetcher 412 can update a set of memory accesses 402 to filter out, from the set of memory accesses 402, speculative memory accesses 440 and/or 448.

At step 910, one or more of the systems described herein, train the cache prefetcher using the updated set of memory accesses. For example, cache prefetcher 412 can train on set of memory accesses 402 that only include non-speculative memory accesses 444 and/or 450.

As detailed above, because cache prefetchers cannot distinguish between correctly predicted paths from those that are mispredicted, cache prefetchers often unknowingly train on data requests from instruction fetches of wrongly predicted paths. Such branch misprediction-agnostic prefetcher training can potentially impact prefetcher accuracy and hence performance and energy efficiency adversely. One of the major negative consequences of wrong-path memory instructions is that the cache prefetcher can increase cache pollution when it is trained on wrong path memory addresses. The systems and methods described herein propose misprediction-aware data prefetcher training that trains on correct path addresses to minimize cache pollution. To that end, speculative status hints can be notified to the prefetchers at various levels in the cache hierarchy.

Multi-level cache hierarchies can store data fetched from a memory for anticipating future reuse. In this manner, fetching from the cache preemptively can minimize average memory latency and energy consumption for data accesses. However, modern processors (e.g., processor x86) can employ aggressive control flow speculation which, in the shadow of a misprediction, can issue a lot of wrong path memory accesses utilizing the large instruction windows coupled with HW support for high Memory Level Parallelism (MLP) in caches. One side-effect of the wrong path memory traffic can be lower performance due to cache data prefetcher training from wrong path memory accesses. This is because cache prefetchers can be trained by all memory requests, independent of whether memory uops will retire or be flushed upon detecting a branch misprediction. As detailed above, the processor core and cache hierarchy can leverage branch misprediction hints and improve cache prefetcher accuracy in the presence of speculative memory operations issued under the shadow of a branch misprediction.

Tagging some or all of memory traffic as speculative when issued in the shadow of a mispredicted branch can allow the cache prefetcher to be aware of corresponding memory accesses that are speculative. Furthermore, tracking the depth of speculation per cache line fetched can allow the cache prefetcher to adjust the decision based on whether data was prefetched via speculative memory traffic. Tagging of memory traffic as speculative can be done with a branch window identifier (BWID). Each demand memory request (load/store/loadOp/opStore/loadOpStore) can have one BWID. Multiple memory instructions can share a BWID, but a memory instruction cannot be tagged with 2 or more BWIDs. For a memory instruction, the BWID can map the oldest branch closest to the memory instruction in program order.

BWIDs can be generated in program order when uop groups are dispatched to the back end of the machine. BWIDs can be assigned in monotonically increasing order. Upon a pipeline flush, the BWID counter can revert back to the last non-flushed BWID value. More specifically, there can be one BWID counter per thread in a SMT core. Furthermore, the BWID can be copied to the LDQ or STQ entry where the memory access instruction is inserted. Once the memory instruction is issued to the L1 DC its Physical Address (PA) and its associated BWID is saved in one of 2 tables, the Branch Load Link Table (BLLT) for a load uop and the Branch Store Link Table (BSLT) for a store uop. Both BLLT and BSLT are tagged with the BWID and can be set-associative or fully associative. All PAs linked to a given BWID can be stored in the same BLLT or BSLT set. If the number of PAs linked to a BWID exceeds the BLLT or BSLT associativity, then some of the PAs cannot be recorded (and are not updated by branch resolution status). Given the average branch frequency in code, the number of memory instructions per BWID can be bounded by a small enough number that matches a degree of associativity of BLLT and BSLT that is amenable to a HW implementation (e.g., 16). In another embodiment, BLLT and BSLT can be fully associative which allows for variable number of memory instructions per BWID.

Each branch can store its BWID in a separate table, called the Branch Issue Table (BIT). The BIT is indexed by the Instruction Window ID and returns the branch's BWID. The table can be accessed for every issued branch and sends the BWID of the resolved branch along with its prediction status (correct or incorrect) to the BLLT and BSLT. Either table can be indexed by the BWID and returns all PAs issued between BWID and (BWID+1) % LDQ size or (BWID+1) % STQ size (BLLT and BSLT use a multi-hit CAM and will return all PAs matching the BWID). Then these PAs enter a queue and can lazily update the status of the corresponding cache lines (in L1 DC, L2 and/or L3) to speculative if the branch was mispredicted. For other circumstances, a default, non-speculative status can be assumed for every line, so no access to BSLT/BLLT and cache update is needed if the branch is correctly predicted. If the lines have not yet been installed in the caches, the PAs can update the MABs which in turn update the cache tags upon installing the data in the cache.

Upon a branch misprediction, the BIT can be flushed using the Instruction Window ID (just like the scheduler and Instruction window itself). Similarly, all BLLT and BSLT entries with a BWID equal or larger than the BWID of the mispredicted branch, can be invalidated after they return the PAs for updating the caches. Invalidation of BLLT and BSLT can be done sequentially across its sets because they are indexed by the BWID.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
   a control circuit configured to:
   receive branch misprediction information corresponding to a mispredicted branch window of instructions; and
   send a misprediction status of a memory access from the mispredicted branch window of instructions; and
   a cache prefetcher of a cache configured to train using a set of memory accesses that are updated in response to receiving the misprediction status from the control circuit.

2. The device of claim 1, wherein the cache prefetcher is configured to update the set of memory accesses by filtering out, from the set of memory accesses, a speculative memory access corresponding to the mispredicted branch window.

3. The device of claim 1, wherein the cache prefetcher is further configured to delay training until the misprediction status is received, from the control circuit, for updating the set of memory accesses.

4. The device of claim 3, wherein the misprediction status identifies the memory access as at least one of a speculative memory access, a non-speculative memory access, or an unresolved memory access.

5. The device of claim 1, wherein the cache prefetcher is configured to:
   copy, prior to training, the set of memory accesses to a prefetcher table;
   train using the copied set of memory accesses in the prefetcher table;
   update the prefetcher table to filter out, from the copied set of memory accesses, a speculative memory access based on the received misprediction status; and
   retrain the cache prefetcher using the updated set-of-prefetcher table.

6. The device of claim 1, wherein the cache prefetcher is configured to train using a heuristic.

7. The device of claim 6, wherein the cache prefetcher is configured to train by using a subset of speculative memory accesses in the set of memory accesses selected based on the heuristic.

8. The device of claim 1, wherein the cache prefetcher is configured to train by retaining speculative memory accesses in the set of memory accesses based on a cache hit ratio corresponding to cache hits of prior speculative memory accesses observed over a period of cycles.

9. The device of claim 8, wherein the cache prefetcher is configured to retain the speculative memory accesses in the set of memory accesses based on the cache hit ratio exceeding a cache hit ratio threshold.

10. The device of claim 1, wherein the cache prefetcher is configured to train by retaining speculative memory accesses in the set of memory accesses based on observing a number of cache lines fetched from prior speculative sets of memory accesses.

11. The device of claim 10, wherein the cache prefetcher is configured to train by retaining the speculative memory accesses in the set of memory accesses based on the number of cache lines fetched from prior speculative sets of instruction fetches exceeding a cache line threshold.

12. A system comprising:
    a physical memory; and
    a processor including a branch predictor, an instruction pipeline having an execution unit, a control circuit, and a cache, wherein:
    the branch predictor is configured to instruct the instruction pipeline to fetch instructions corresponding to each branch window of instructions;

the execution unit is configured to send, to the control circuit, branch misprediction information indicating that each branch window is mispredicted;

the control circuit is configured to identify, based on the branch misprediction information, a speculative memory access corresponding to a branch window; and the cache includes a cache prefetcher configured to:
update, based on the identified speculative memory access, a set of memory accesses that are used for cache prefetcher training; and
train on the updated set of memory accesses.

13. The system of claim 12, wherein updating the set of memory accesses for training by the cache prefetcher further comprises filtering out, from the set of memory accesses, the identified speculative memory access.

14. The system of claim 13, wherein the control circuit is configured to:
identify a branch window identifier corresponding to the branch misprediction information; and
identify the speculative memory access associated with the branch window identifier using a memory address that corresponds to the identified speculative memory access.

15. The system of claim 14, wherein the cache receives the memory address corresponding to the identified speculative memory access from the control circuit.

16. The system of claim 13, training the cache prefetcher further comprises delaying training until after filtering out the identified speculative memory access from the set of memory accesses.

17. The system of claim 12, wherein the cache prefetcher is configured to:

copy, prior to training, the set of memory accesses to a prefetcher table;
train on the copied set of memory accesses in the prefetcher table;
update the prefetcher table to filter out, from the copied set of memory accesses, the identified speculative memory access; and
retrain using the updated prefetcher table.

18. The system of claim 12, wherein the cache prefetcher is configured to train on a subset of speculative memory accesses in the set of memory accesses based on a heuristic corresponding to at least one of a cache hit ratio from prior speculative memory accesses or a number of cache lines fetched from prior speculative sets of memory accesses.

19. A method comprising:
determining, by an instruction pipeline, a mispredicted branch window of instructions;
identifying, by a control circuit, a memory access corresponding to the mispredicted branch window;
sending, from the control circuit to a cache that includes a cache prefetcher, the identified memory access;
updating a set of memory accesses for training the cache prefetcher based on the identified memory access; and
training the cache prefetcher using the updated set of memory accesses.

20. The method of claim 19, wherein identifying the memory access further comprises:
identifying a branch window identifier corresponding to a branch misprediction information;
identifying the memory access associated with the branch window identifier; and
identifying a memory address corresponding to the identified memory access.

* * * * *